US010965377B1

(12) United States Patent
Appel et al.

(10) Patent No.: US 10,965,377 B1
(45) Date of Patent: Mar. 30, 2021

(54) THERMAL TUNING AND QUADRATURE CONTROL USING ACTIVE EXTINCTION RATIO TRACKING

(71) Applicant: Cisco Technology, Inc., San Jose, CA (US)

(72) Inventors: Craig S. Appel, Macungie, PA (US); Romesh Kumar Nandwana, Breinigsville, PA (US); Sanjay Sunder, Allentown, PA (US); Kadaba Lakshmikumar, Basking Ridge, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/745,257

(22) Filed: Jan. 16, 2020

(51) Int. Cl.
*H04B 10/00* (2013.01)
*H04B 10/556* (2013.01)
*G02B 6/12* (2006.01)
*G01B 9/02* (2006.01)
*H04B 10/50* (2013.01)
*H04B 10/588* (2013.01)
(Continued)

(52) U.S. Cl.
CPC ....... *H04B 10/556* (2013.01); *G01B 9/02083* (2013.01); *G02B 6/12019* (2013.01); *H04B 10/25891* (2020.05); *H04B 10/5051* (2013.01); *H04B 10/5053* (2013.01); *H04B 10/588* (2013.01)

(58) Field of Classification Search
CPC .......... H04B 10/5057; H04B 10/50572; H04B 10/50575; H04B 10/50577
See application file for complete search history.

(56) References Cited

U.S. PATENT DOCUMENTS 8,929,689 B2   1/2015   Metz et al.
9,964,703 B2   5/2018   Parker et al.
(Continued)

FOREIGN PATENT DOCUMENTS

WO   2015136877 A1   9/2015

OTHER PUBLICATIONS

M. Sotoodeh, Y. Beaulieu, J. Harley and D. L. McGhan, "Modulator Bias and Optical Power Control of Optical Complex E-Field Modulators," Journal of Lightwave Technology, vol. 29, No. 15, pp. 2235-2248, Aug. 1, 2011. (Abstract Only).
(Continued)

*Primary Examiner* — Daniel G Dobson
(74) *Attorney, Agent, or Firm* — Patterson + Sheridan, LLP (57) ABSTRACT

Thermal tuning and quadrature control of opto-electronic devices using active extinction ratio tracking is proved by phase shifting, via a first phase shifter, a first optical signal carried on a first arm of an interferometer relative to a second optical signal carried on a second arm of the interferometer; combining the first optical signal with the second optical signal as an output signal; detecting a peak value in the output signal; and adjusting a relative phase offset imparted by the first phase shifter on the first optical signal relative to the second optical signal, based on the peak value, to increase an amplitude of the peak value. In various embodiments, the peak value is increased over time to maximize an extinction ratio of the optoelectronic device and maintain the extinction ratio in a maximized state during operation.

18 Claims, 9 Drawing Sheets

(51) Int. Cl.
*H04B 10/25* (2013.01)
*H04J 14/00* (2006.01)

(56) References Cited

U.S. PATENT DOCUMENTS

2012/0195600 A1   8/2012   Winzer
2018/0109322 A1*  4/2018   Li ........................ G02F 1/0123

OTHER PUBLICATIONS

Mamoru Endo, Tyko D. Shoji, Thomas R. Schibli , "High-Sensitivity Optical to Microwave Comparison with Dual-Output Mach-Zehnder Modulators" Scientific Reports (2018) 8:4388 DOI:10.1038/s41598-018-22621-1.

* cited by examiner

THERMAL TUNING AND QUADRATURE CONTROL USING ACTIVE EXTINCTION RATIO TRACKING

TECHNICAL FIELD

Embodiments presented in this disclosure generally relate to drivers for use with Mach-Zehnder Interferometers (MZI) and other optical modulators. More specifically, embodiments disclosed herein actively track the extinction ratio at an output from an interferometer to enable the interferometer to self-tune based on performance feedback.

BACKGROUND

In various photonic circuit elements, such as switches, modulators, and Variable Optical Attenuators (VOA), input optical signals are split and/or combined to produce various output optical signals of desired amplitudes. Extinction of an optical signal may occur by splitting an input optical signal into two signals and combining the two signals to interfere with one another so that an output optical signal has a reduced amplitude from that of the input optical signal. An extinction ratio ($r_e$) can be calculated based on the relative ratio in amplitude of the high and low output optical signals, (e.g., $r_e = P_{high}/P_{low}$). In some photonic circuits, it is desirable to produce an output signal such that $r_e$ is below a threshold, so that downstream circuit elements are not inadvertently activated and so that carrier waves are suppressed for signal analysis. In other photonic circuits, it is desirable to maximize $r_e$ so that the input optical signal is used at a maximum modulation efficiency.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method for thermal tuning and quadrature control using active extinction ratio tracking that includes: phase shifting, via a first phase shifter, a first optical signal carried on a first arm of an interferometer relative to a second optical signal carried on a second arm of the interferometer; combining the first optical signal with the second optical signal as an output signal; detecting a peak value in the output signal; and adjusting a relative phase offset imparted by the first phase shifter on the first optical signal relative to the second optical signal, based on the peak value, to increase an amplitude of the peak value.

One embodiment presented in this disclosure provides a device for thermal tuning and quadrature control using active extinction ratio tracking that includes an interferometer, including: an optical input; a splitter, connected to the optical input, configured to split an optical signal carried by the optical input onto a first arm and a second arm, wherein the first arm comprises a first phase shifter and the second arm comprises a second phase shifter; and a combiner, connected to the first arm and the second arm, configured to re-combine the optical signal carried on the first arm and a second arm onto an optical output; a trans-impedance amplifier (TIA) configured to detect a peak value in the optical output of the interferometer; and a controller, including a loop filter, configured to adjust a phase offset between the first phase shifter and the second phase shifter based on an amplitude of the peak value.

One embodiment presented in this disclosure provides a method for thermal tuning and quadrature control using active extinction ratio tracking that includes feeding a known data pattern, a random data pattern, or live data traffic to an interferometer; selecting one of a first phase shifter disposed on a first arm of the interferometer and a second phase shifter disposed on a second arm of the interferometer as a powered phase shifter; applying a series of phase offsets to the powered phase shifter until a peak value at an output of the interferometer converges to a steady state value according to a convergence threshold, wherein a phase offset associated with the steady state value is selected as an operational value; receiving an operational data stream as a first signal on the first arm and a second signal on the second arm; phase shifting one of the first signal and the second signal by the powered phase shifter according to the operational value; measuring the peak value at the output of the interferometer; applying, by the powered phase shifter, a first phase shift greater than the operational value; and in response to the peak value increasing in response applying the first phase shift, applying a second phase shift greater than the first phase shift.

Example Embodiments

To provide an extinction ratio ($r_e$) that meets the threshold requirements of an end user, an optical device (such as an interferometer) can be calibrated at a fabricator's facility before being sent to the end user's facility and installed in a system for use. Similarly, the optical devices can be quadrature biased to produce an ideal output of $((1+\cos(\Theta))\div 2)$, but in practice can be tuned to provide an output over a threshold or tolerance of the ideal output (e.g., a range threshold). However, heat build-up during normal operation of the optical device can alter physical characteristics of the components of the optical device (e.g., due to thermal degradation or drift), the factory calibrated set points may become unreliable in the field. Accordingly, factory test and calibration can lead to false positive and false negatives (passing units that fail in the field and failing units that could operate in the field) or require extensive and time consuming verification of edge cases during production.

The present disclosure provides systems and methods for improving extinction ratios in silicon photonic elements using active feedback control. Active feedback control, as discussed herein, allows for the photonic device to adjust the phase offsets between two signals carried by the optical device without relying on a static factory-set calibration value (or calculated temperature-based adjustments thereto). Instead, by actively monitoring the extinction ratio signal at the output of the optical device, a controller for the optical device can adjust phase shifters in the optical device to ensure that the phase offset is properly set for the present operating conditions of the optical device. The controller adjusts the phase offsets to ensure a peak value of the output satisfies the amplitude requirements of the device (e.g., an extinction ratio or amplification). Accordingly, the optical device is continuously calibrated during operations, and allows for a shorter initial calibration without using a known or predefined calibration signal. Stated differently, live signals of (initially) unknown value are used for ensuring the optical signal strength satisfies a threshold value. Additionally, because calibration is maintained during operations of the optical device, heat-build up and wear in the optical device can be accounted for, thus providing a potentially more robust and longer-lived optical device.

Figure 1:
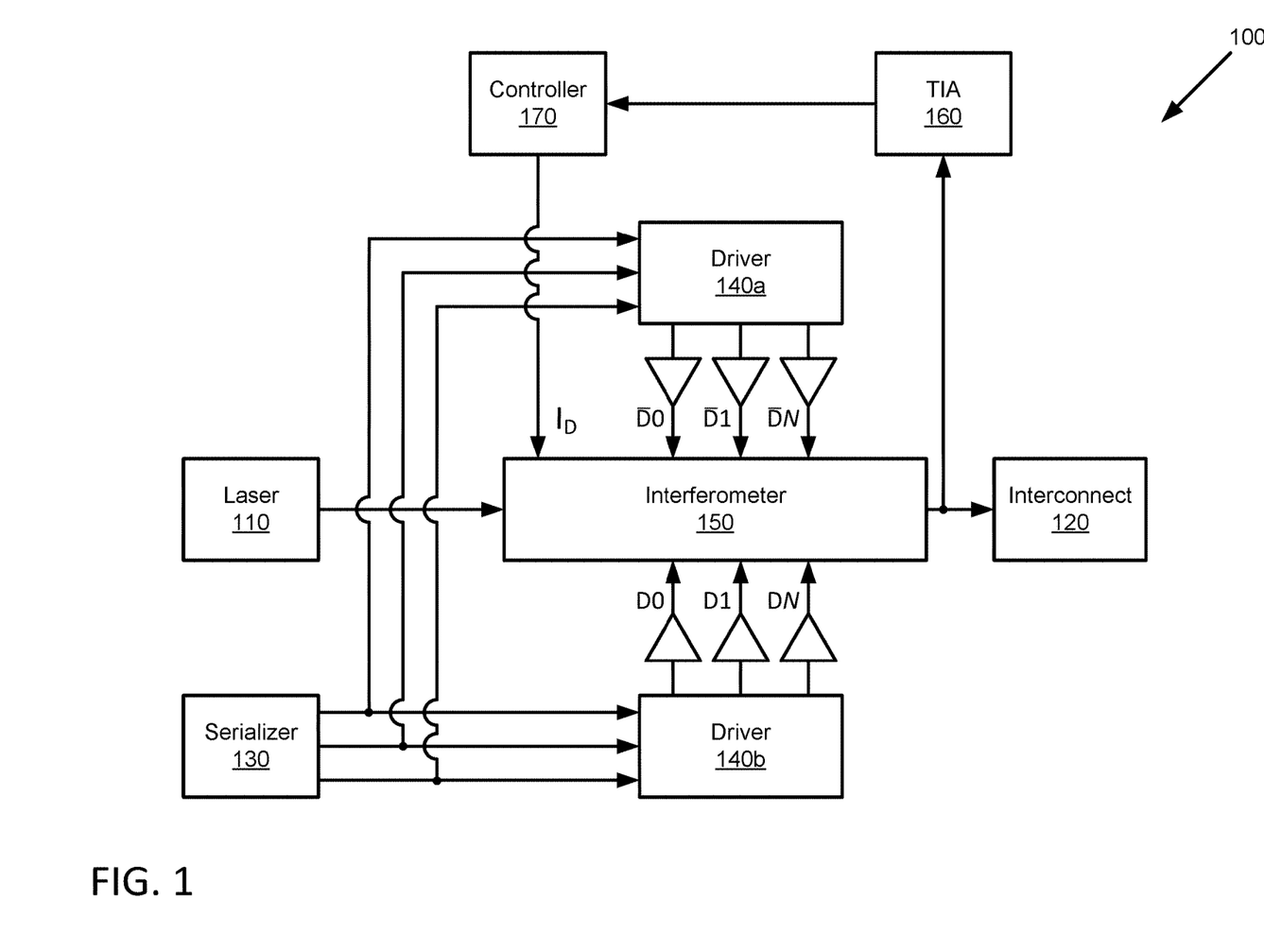
FIG. 1 illustrates example components of an optical signaling device, according to embodiments of the present disclosure.

FIG. 1 illustrates example components of an optical signaling device 100, according to embodiments of the present disclosure. The optical signaling device 100 may be constructed on a single chip or multiple chips to generate an optical carrier signal, impart data (via modulation) onto the carrier signal, and transmit the data on the carrier signal to an external device. Although various components of the optical signaling device 100 are illustrated, one of skill in the art will recognize that other components may also be included in the optical signaling device 100, such as, for example, various taps or probes to monitor signal characteristics, a power source, amplifiers, filters, etc.

A laser 110, or other light source, generates an optical carrier signal (e.g., a continuous wave (CW) optical signal), which is output through an interconnect 120 to an external device or transmission medium (e.g., an optical fiber or waveguide). An interferometer 150 in the signal path between the laser 110 and the interconnect 120 splits the optical signal into two versions, which are each phase shifted and/or modulated to encode data for transmission, and then recombined for transmission. The interferometer 150 and components thereof are discussed in greater detail in regard to FIG. 2.

A serializer 130 receives the data to be encoded onto the optical carrier signal as electrical inputs from an external device and serializes the data according to an externally provided clock signal or an internal clock. The serializer 130 may receive the data as a packet or in another electronic format and provides the data to a first driver 140a and a second driver 140b (generally, driver 140). The drivers 140 control signal modulators (discussed in greater detail in regard to FIG. 2) within an interferometer 150 to modulate the carrier signal to encode the data thereon. The serializer 130 spaces the data transmission for encoding by the drivers 140 to account for signal propagation delay within the optical signaling device 100 so that the interferometer 150 can encode the data reliably onto the optical carrier signal.

As illustrated, the first driver 140a and the second driver 140b apply complementary signals (e.g., $D_0$ versus $\overline{D}_0$) to opposing arms within the interferometer 150 so that the effects of the data encoding can constructively or destructively interfere when the interferometer 150 recombines the signals carried on each arm. For example, when carrying an optical carrier signal of amplitude X, each opposing arm in the interferometer 150 nominally carries a version of the optical carrier signal of amplitude X/2, with the first arm carrying a complement of the signal carried on the second arm (e.g., X/2 versus −X/2). In some embodiments, only one of the first driver 140a or the second driver 140b is used at a given time; applying either D or $\overline{D}$ to the associated arm of the interferometer 150 to encode a given value onto the optical carrier signal. In other embodiments, the first driver 140a encodes the complement of the value encoded by the second driver 140b. In some embodiments, only one driver 140 is provided, with amplifiers providing D and/or inverting amplifiers providing $\overline{D}$ to the associated arms of the interferometer 150. When active, the drivers 140 encode the data to the optical carrier signal via one or more modulators in an associated arm of the interferometer 150 for different modulation formats (e.g., for PAM-N modulation $D_0$ to $D_N$ will carry different data while for NRZ (Non-Return to Zero) transmission all the modulators $D_0$-$D_N$ will carry the same data). Additionally, in some embodiments, a one-segment driver 140 can linearly drive multi-level data.

The interferometer 150 is in communication with a transimpedance amplifier (TIA) 160, which measure a peak value in the output of the interferometer 150. The TIA 160 converts an electrical current representing a (tapped) optical output from the interferometer 150 into a voltage measurement that is used by the controller 170 to control phase shifters within the interferometer 150 to phase shift one or both of the versions of the carrier signal on opposing arms of the interferometer 150 before the data are encoded onto the optical signal by the drivers 140. The TIA 160 and components thereof are discussed in greater detail in regard to FIG. 3. The controller 170 and components thereof are discussed in greater detail in regard to FIG. 4.

Figure 2:
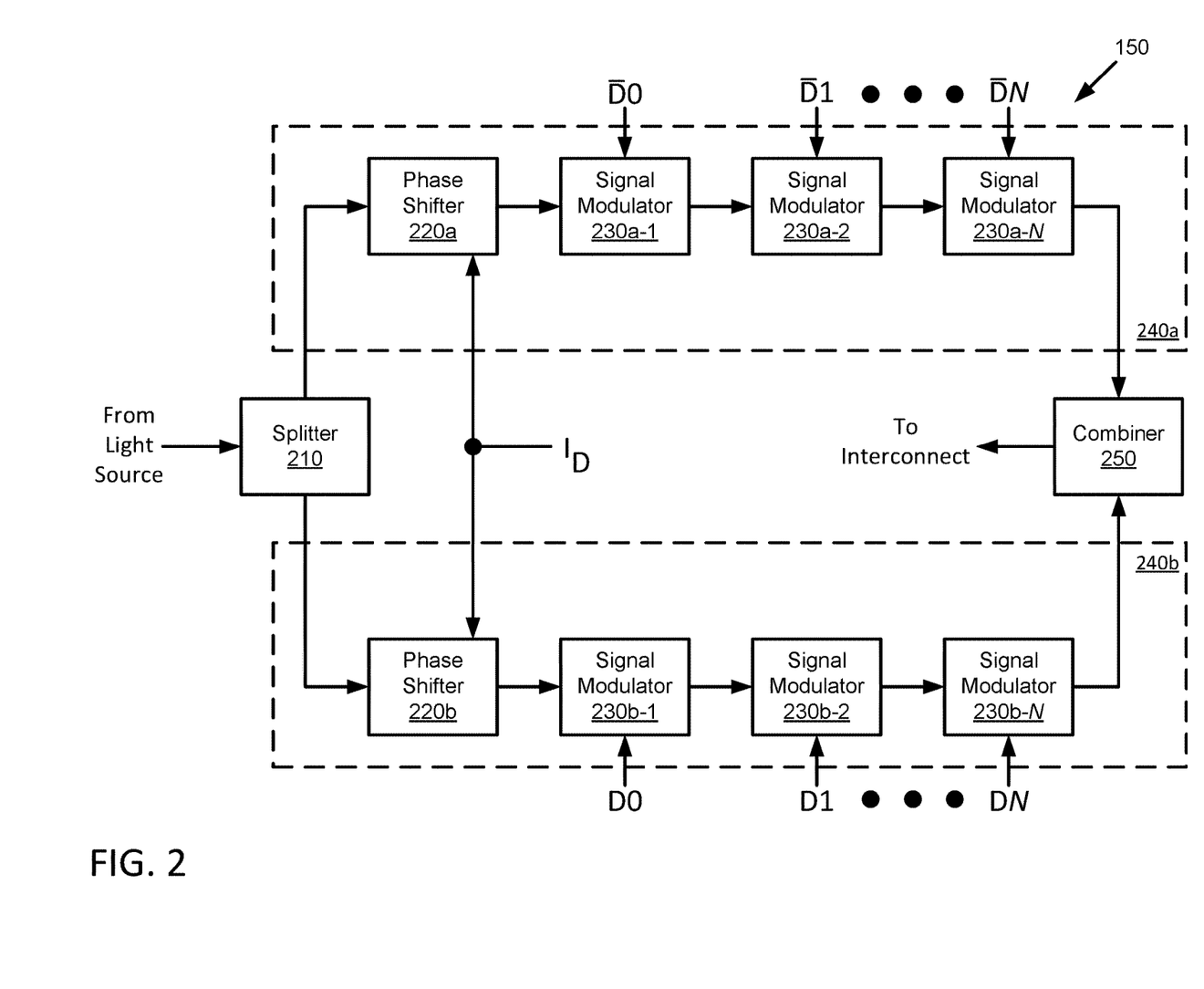
FIG. 2 illustrates example components of the interferometer, according to embodiments of the present disclosure.

FIG. 2 illustrates example components of the interferometer 150, according to embodiments of the present disclosure. The interferometer 150 includes a splitter 210, which is connected to the laser 110 or other light source, and splits optical carrier signals provided from the laser 110 onto a first signal arm 240a and a second signal arm 240b (generally, signal arm 240). Each signal arm 240 carries a respective version of the optical carrier that is approximately half the power of the original optical carrier, and applies various phase shifts and modulations to the optical carrier to encode data before being recombined by the combiner 250 for transmission. The combiner 250 is connected to the output side of each signal arm 240, and to the interconnect 120, and is configured to re-combine the signals carried on each of the signal arms 240 into an output signal for transmission. The splitter 210 and the combiner 250 can be realized as active or passive Y-junctions (amplifying or filtering one or more legs) or with other junction geometries in various embodiments, which may include various taps for measuring the characteristics of the signals carried thereon.

Each signal arm 240 includes a phase shifter 220 (a first phase shifter 220a on the first signal arm 240a and a second phase shifter 220b on the second signal arm 240b), which is a physical component that shifts the phase of a signal carried through that component. The embodiments herein can be used with various types of phase shifters 220 to affect the phase of a signal carried in a given signal arm 240, which may operate based on varying principals. For example, a thermo-optic phase shifter 220 applies a controlled temperature to the transmission path of the signal arm 240 through which a signal is transmitted to affect a phase at which the signal exits the phase shifter 220. In some embodiments, the phase shifter 220 may be an electro-optic material, such as lithium niobate. Each phase shifter 220 ideally affects only the phase of signals passed therethrough, but in operation some losses in amplitude may be experienced, and different phase shifters 220 may impart different losses. By shifting the relative phases of signals carried on parallel signal arms 240, the phase shifters 220 align the respective signals to cause destructive or constructive interference at the combiner 250; extinguishing or amplifying the amplitude of one or more signals.

In various embodiments, the phase shifters 220 are configured to produce two versions of the optical carrier that are orthogonal (e.g., quadrature biased) to one another or offset by another desired phase difference. Stated differently, the phases of the two versions of the optical carrier are offset by $\pi/2$ radians. In some embodiments, the first phase shifter 220a may apply a phase offset of $\pi/4$ radians to the optical carrier, while the second phase shifter 220b may apply a phase offset of $-\pi/4$ radians to the optical carrier (or apply no offset) to set the two versions as orthogonal of one another. In some embodiments, the second phase shifter 220b may be unpowered or omitted. In some embodiments, both the first phase shifter 220a and the second phase shifter 220b apply offsets (e.g., $+\pi/4$ and $-\pi/4$ radians, $+\pi/8$ and $-\pi/8$ radians) to the optical carrier to produce two versions of the optical carrier with various offsets (e.g., orthogonal). In some embodiments, the phase shifters 220 can account for phase shifts imparted by components downstream from the phase shifters 220 so that the two versions of the optical signal carried on the respective signal arms 240 are orthogonal (or at another predefined relative phase) when combined at the combiner 250.

In some embodiments, the phase shifters 220 can account for phase shifts imparted by components downstream from the phase shifters 220 so that the two versions of the optical signal carried on the respective signal arms 240 are held at various desired phase offsets to one another when combined at the combiner 250. When accounting differences in manufacture, thermal degradation during operation, wear over a device's lifetime, etc., the phase shifters 220 may impart a phase offset that is greater than or less than the ideal offset of $\pi/2$ radians so that the two versions of the carrier signal will be evenly offset at $\pi/2$ radians at the output of the combiner 250. A driving current $I_D$ (received from the controller 170 (not illustrated) or another logic device) controls one or more of the phase shifters 220 to impart the phase offset by actively monitoring the combined strength of the two versions of the carrier signal at the output of the combiner 250 and adjusting the phase offset to track the quadrature bias point of the two versions so that the two versions are phase shifted to combine with one another at the desired offset.

The first signal arm 240a and the second signal arm 240b are also illustrated as including a first set of signal modulators 230a-1 through 230a-N and a second set of signal modulators 230b-1 through 230b-N (generally, signal modulator 230) respectively. Although each set of signal modulators 230 is presented as including three signal modulators 230, more or fewer than three signal modulators 230 can be incorporated in each signal arm 240 in other embodiments. Each signal modulator 230 includes an active portion, which imparts a controlled, variable modulation to the phase of a carried signal based on a supplied voltage, and may optionally include an amplifying portion to offset any losses in signal strength inherent to the signal modulator 230. In addition to phase modulation, a signal modulator 230 may also induce variable amplitude modulation to boost the strength of signals carried through that component.

In various embodiments, a variable portion of the signal modulator 230 may be a low-doped semiconductor in a semiconductor-insulator-semiconductor-capacitor (SIS-CAP) arrangement that imparts a variable drop or gain in optical signal strength. In other embodiments, a forward-biased PIN diode or a reverse biased PN junction device may be used in variable portion of the signal modulator 230. The variable portion is controlled according to an associated driving signal (e.g., $D_0, D_1, \ldots D_N$ or $\overline{D}_0, \overline{D}_1, \ldots \overline{D}_N$) that encodes data onto the optical carrier by increasing or decreasing the modulation order for a multi-level signaling scheme e.g., PAM-4 (Pulse Amplitude Modulation, level 4), PAM-8, etc.).

Figure 3:
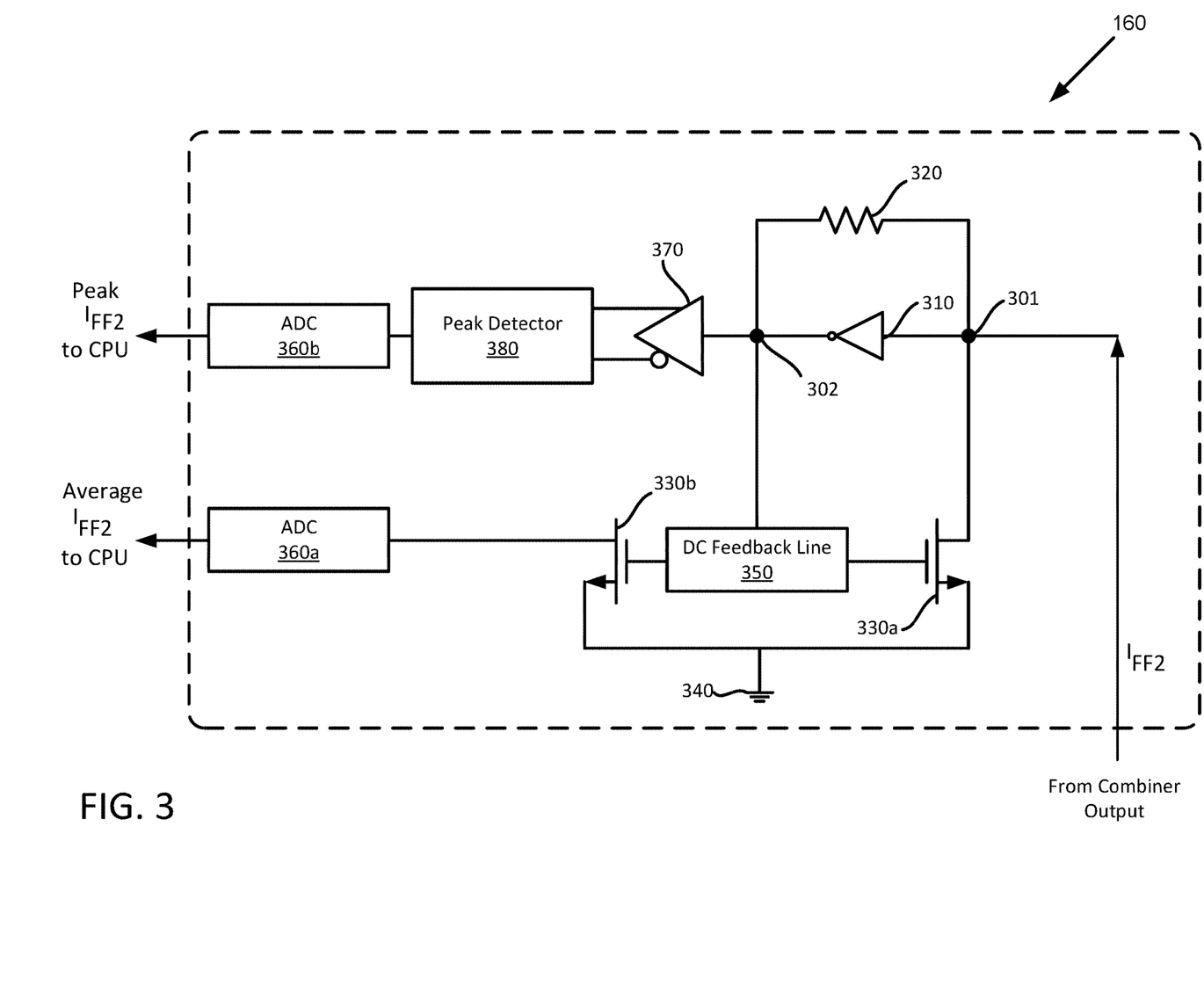
FIG. 3 illustrates a trans-impedance amplifier, according to embodiments of the present disclosure.

FIG. 3 illustrates a TIA 160, according to embodiments of the present disclosure. The TIA 160 along with the controller 170 provide a logic circuit to drive the phase shifters 220 to improve the extinction ratio between the two arms 240. The TIA 160 receives an electrical signal $I_{FF2}$ based on the optical signal output from the combiner 250 of the interferometer 150 and outputs an amplified and digitized version of the average value of electrical signal $I_{FF2}$ and a digitized peak value of the electrical signal $I_{FF2}$ to the controller 170 for analysis.

The TIA 160, at a first node 301, receives the combined signal output from the combiner 250 of the interferometer 150 as an input. An inverting amplifier 310 and a resistor 320 are connected in parallel between the first node 301 and a second node 302 to translate the $I_{FF2}$ current into a voltage and amplify the input combined signal.

A first current source 330a (generally, current source 330), such as a Metal Oxide Field Effect Transistor (MOSFET) or other powered semiconductor device, is disposed between the first node 301 and ground 340, and is controlled via a direct current (DC) feedback line 350 connected to a gate of the first current source 330a to conduct the DC offset portion of the measured combined signal to ground.

Additionally, the DC feedback line 350 is connected to a gate of a second current source 330b, which is connected between ground 340 and an input for a first Analog to Digital Converter (ADC) 360a (generally, ADC 360) to provide a digitized version of the electrical signal $I_{FF2}$ to the controller 170.

An input of the programmable gain amplifier 370 is connected to the second node 302, and produces both an amplified version and an amplified-inverted version of the electrical signal $I_{FF2}$. A peak detector 380 receives the amplified and amplified-inverted version to identify a peak value in the electrical signal $I_{FF2}$. The peak value is digitized by a second ADC 360b, and output to the controller 170.

Figure 4:
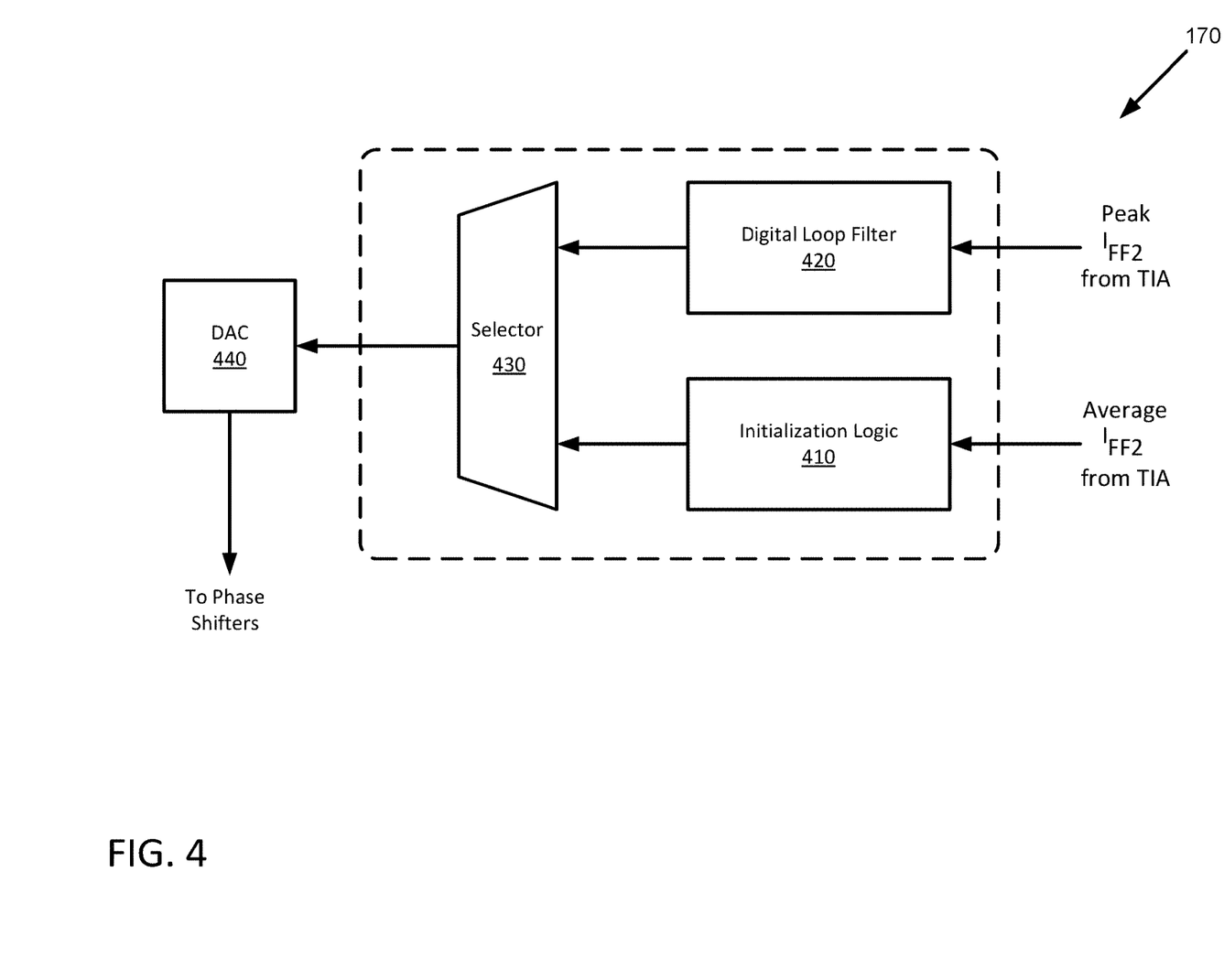
FIG. 4 illustrates a central processing unit, according to embodiments of the present disclosure.

FIG. 4 illustrates a controller 170, according to embodiments of the present disclosure. The controller 170 may be implemented in a microprocessor or other logic control device that includes initialization logic 410, a digital loop filter 420, and a selector 430 and a digital to analog converter (DAC) 440.

The initialization logic 410 determines which arm 240 of the interferometer 150 is to be driven by the driving current $I_D$ and what the initial amplitude of the driving current $I_D$ is to be. In various embodiments, the initialization logic 410 is performed at device start-up, but may also be performed periodically (e.g., every s seconds), in response to a reset command, or at other times indicated by an operator. The initialization logic 410 monitors the extinction ratio of the interferometer 150 via the output $I_{FF2}$ at several known values to determine the slope between an un-phase shifted signal and signals phase shifted with a known amount of power on one of each of the arms 240. In some embodiments, the initialization logic 410 can perform some or all of the operations described in greater detail in regard to FIG. 7.

The digital loop filter 420 receives the peak value determined by the peak detector 380 as an input and determines how to adjust the driving current $I_D$ to ensure that the extinction ratio for the interferometer 150 is maintained or improved upon over time. As the adjustments increase or decrease the extinction ratio, the digital loop filter 420 alters the amount of power used to drive a phase shifter 220 to alter the phase offset imparted to a corresponding version of the carrier signal on that signal arm 240. In some embodiments, the digital loop filter 420 can perform some of all of the operations described in greater detail in regard to FIG. 8.

The selector 430 receives inputs from the initialization logic 410 and from the digital loop filter 420, and determines which one's output to provide as the driving current $I_D$ to one or more of the phase shifters 220. Additionally, based on input from the initialization logic 410, the selector 430 can select which phase shifter 220 receives which driving current $I_D$ (e.g., the first/second phase shifter 220a/220b receives the driving current $I_D$).

Figure 5:
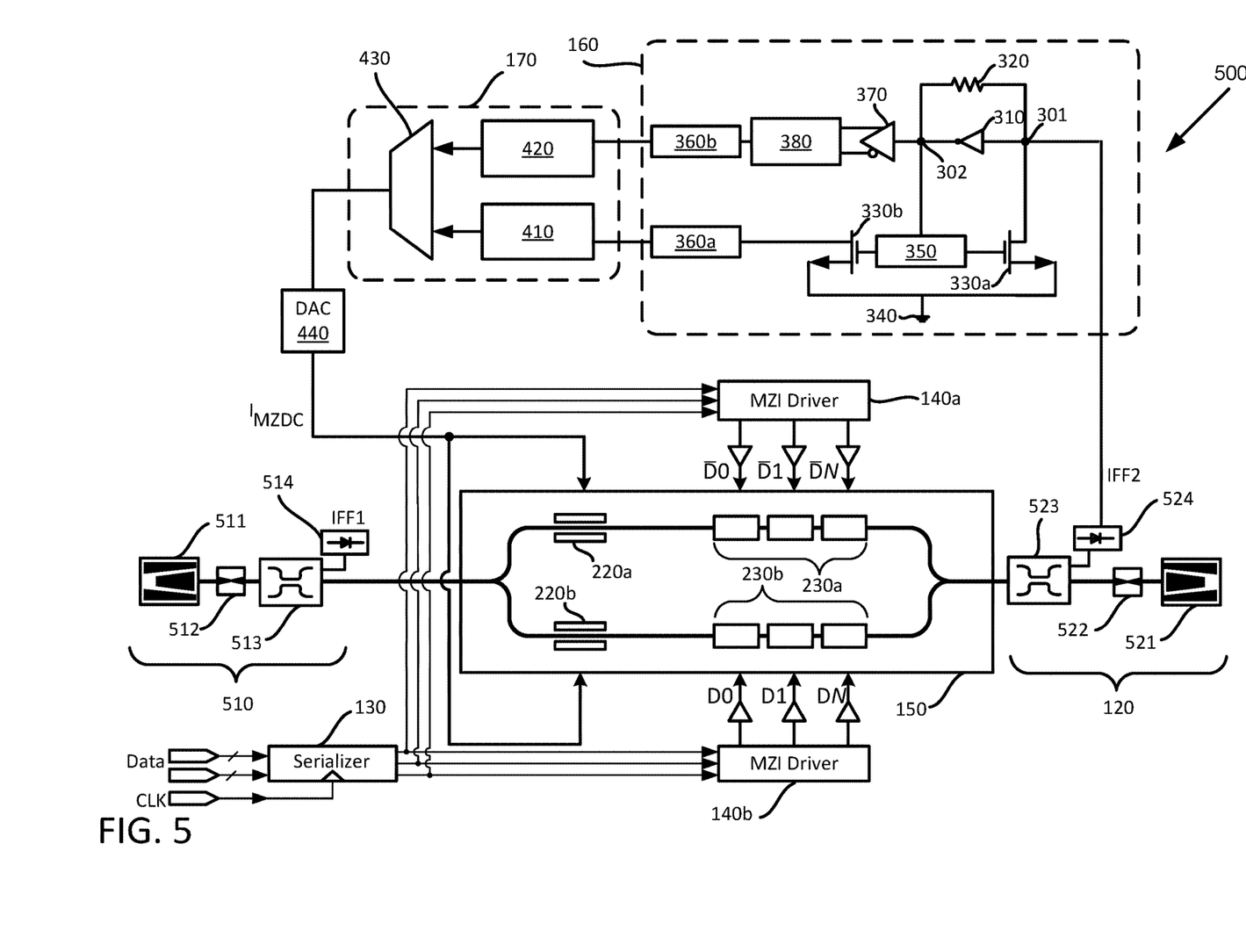
FIG. 5 illustrates a layout of an optical signaling device on an integrated circuit, according to embodiments of the present disclosure.

FIG. 5 illustrates a layout of an optical signaling device 100 on an integrated circuit 500, according to embodiments of the present disclosure. The integrated circuit 500 can include some or all of the elements of the optical signaling device 100 described in FIG. 1, the interferometer 150 described in FIG. 2, the trans-impedance amplifier 160 described in FIG. 3, and the controller 170 described in FIG. 4, as well as additional components. For example, the laser 110 may be included in the integrated circuit 500 or be fabricated on a separate chip from the other components of the optical signaling device 100 can be linked to the interferometer 150 via a laser interconnect 510.

In embodiments using a laser interconnect 510, the laser interconnect 510 includes a fastener 511 to hold the laser 110 in place. The waveguides of the laser 110 are aligned at an input optical coupling 512 relative to the waveguides of the interferometer 150 used to receive light. The input optical coupling 512 may include various optical coatings and surface treatments to reduce back reflection and other aberrant optical signaling conditions, and may include butt-coupled joints and evanescent joints to receive the optical carrier signal from the laser 110 and transmit that optical carrier signal to the interferometer 150. Additionally, an input tap 513 can be included to measure a predefined percentage of the strength of the optical carrier signal carried thereover (e.g., 5%), the output of which may be provided as an electrical output ($I_{FF1}$) for use by a controller 170 (e.g., on an external logic circuit) by an input optical converter 514 (e.g., a photodiode to convert optical signals to electrical signals).

In some embodiments the interconnect 120 includes similar elements as the laser interconnect 510, but on the output side of the interferometer 150. Accordingly, the interconnect 120 can provide a logic circuit with details on the signal characteristics of the output data-encoded signal from the interferometer 150 and ensure a proper connection with an external device or optical cable for transmission. An output tap 523 can be included to measure a predefined percentage of the amplitude of the data-encoded optical carrier signal carried thereover (e.g., 5%), the output of which is provided as an electrical output ($I_{FF2}$) for use by the TIA 160 and controller 170 by an output optical converter 524 (e.g., a photodiode to convert optical signals to electrical signals). An output fastener 521 is included to hold the output waveguides of interferometer 150 in alignment at an output optical coupling 522 with the transmission cables or external device receiving the data-encoded signal. The output optical coupling 522 may include various optical coatings and surface treatments to reduce back reflection and other aberrant optical signaling conditions, and may include butt-coupled joints and evanescent joints to receive the data-encoded signal from the interferometer 150 and transmit the data externally from the integrated circuit 500.

Figure 6:
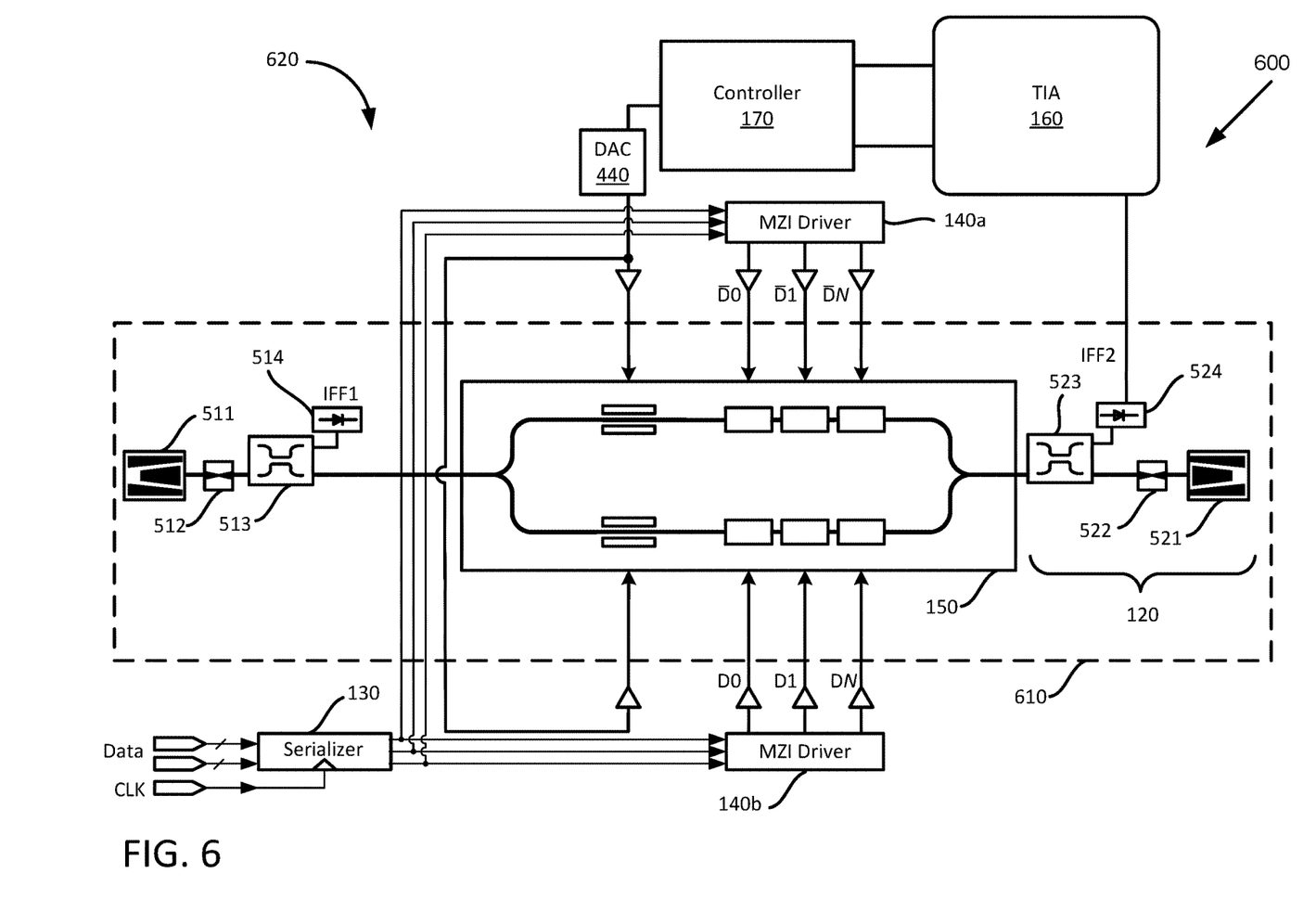
FIG. 6 illustrates a piecewise layout of an optical signaling device on two or more integrated circuits, according to embodiments of the present disclosure.

FIG. 6 illustrates a piecewise layout 600 of an optical signaling device 100 on two or more integrated circuits, according to embodiments of the present disclosure. As will be appreciated, different components of an optical signaling device 100 may be fabricated according to different processes, and fabricators may produce various components as modular entities that can be swapped in or out of different optical signaling devices 100 (or other circuits) as engineering requirements dictate. Additionally, the physical structures of one component may be incompatible with the construction processes of another component. Therefore, a fabricator may desire to layout the optical signaling device in one or more a photonic integrated circuits (PICs) 610 that include the optical components of the optical signaling device 100, and in one or more electrical integrated circuit (EIC) 620 that include the electrical components of the optical signaling device 100.

The PIC 610 and the EIC 620 may be fabricated on separate wafers with several dies defining several instances of the respective PICs 610 or EIC 620 that use different substrates, deposition or growth processes, and/or form different sub-components made of different materials. The PICs 610 and EICs 620 can be combined into the optical signaling device 100 by various wire bonds, interposer circuits, or direct connections between the associated electrical inputs and outputs of the PICs 610 and EIC 620. For example, a wire may be connected to an output of a driver 140 and to the input of a signal modulator 230 to allow the driver 140 to electrically control the signal modulator 230. In another example, the output optical converter 524 may be connected to a trace on an interposer circuit that is also connected to the input of the TIA 160 to supply the TIA 160 with an electrical signal corresponding to the strength of the optical carrier. The PIC and EIC can be manufactured on a single wafer as well.

Figure 7:
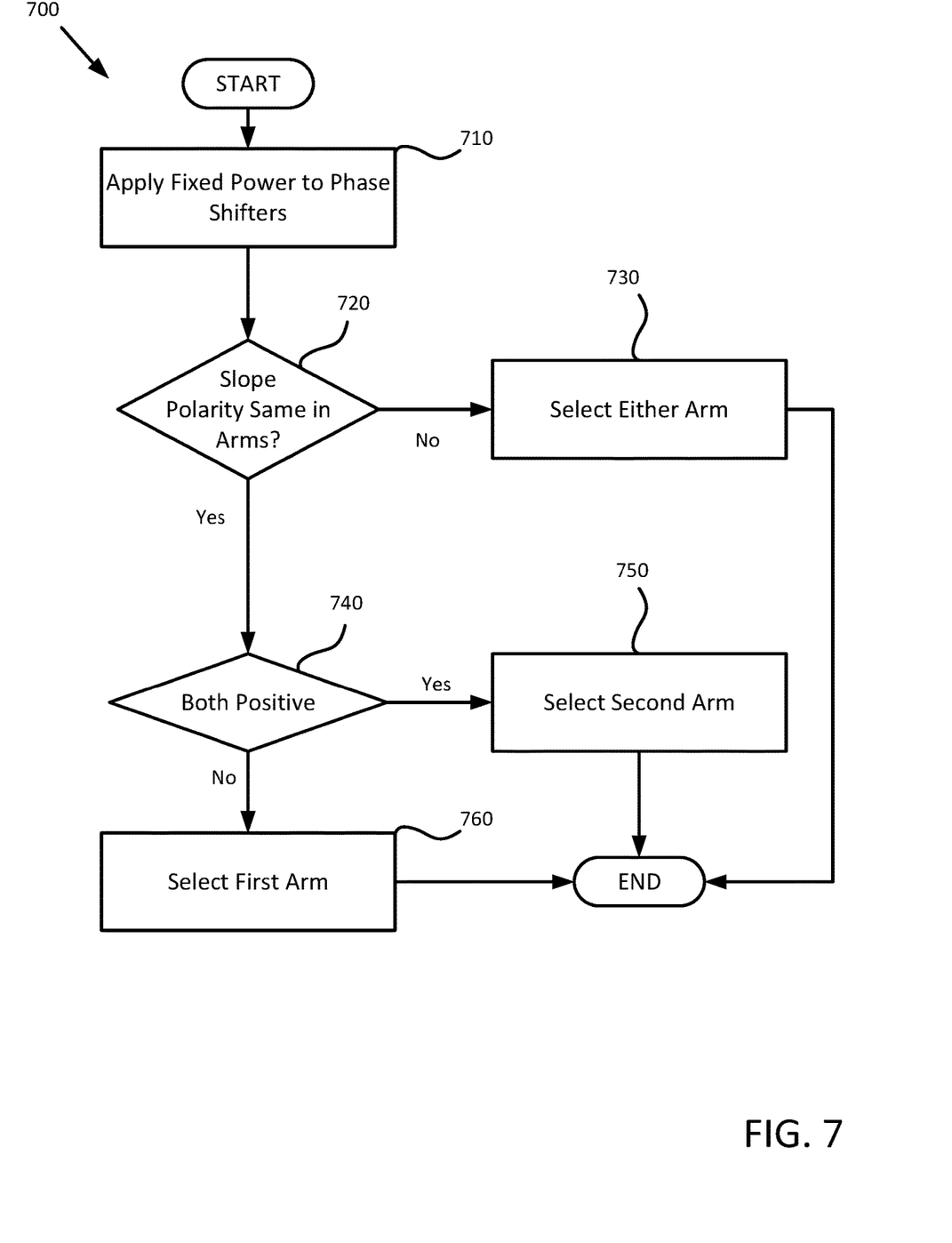
FIG. 7 is a flowchart of a method for identifying which arm of an interferometer to select as a driven or powered arm, according to embodiments of the present disclosure.

FIG. 7 is a flowchart of a method 700 for identifying which arm 240 of an interferometer 150 to select to have the powered phase shifter 220, according to embodiments of the present disclosure. Method 700 begins when the optical signaling device 100 is first powered on, in response to a reset command, or periodically per device settings.

At block 710, the optical signaling device 100 measures the output signal from the interferometer 150 while applying a series of fixed powers to the phase shifters 220 on each of the signal arms 240. The initialization logic 410 identifies an initial output current $I_{FF2-0}$ when a signal is passed through the interferometer 150 without a phase adjustment to either of the phase shifters 220 (i.e., the fixed power applied to both the first phase shifter 220a and the second phase shifter 220b is zero Watts). The initialization logic 410 then applies a known power to the first phase shifter 220a (i.e., a fixed power of X Watts is applied to the first phase shifter 220a and zero Watts to the second phase shifter 220b), and identifies a first offset output current $I_{FF2-1}$. Similarly, the initialization logic 410 applies the known power to the second phase shifter 220b (i.e., a fixed power of X Watts is applied to the second phase shifter 220b and zero Watts to the first phase shifter 220a), and identifies a second offset output current $I_{FF2-2}$.

At block 720, the initialization logic 410 determines whether slope polarity is the same in both arms 240 or is different. The initial output current $I_{FF2-0}$ is used relative to the first offset output current $I_{FF2-1}$ to determine the slope for the first arm 240a according to Formula 1. The initial output current $I_{FF2-0}$ is used relative to the second offset output current $I_{FF2-2}$ to determine the slope for the second arm 240b according to Formula 2.

$$\text{Slope}_1 = I_{FF2-1} - I_{FF2-0} \qquad \text{[Formula 1]}$$

$$\text{Slope}_2 = I_{FF2-0} - I_{FF2-2} \qquad \text{[Formula 2]}$$

If the slope for the first arm 240a and the slope for the second arm 240b are different polarities from one another (e.g., one is negative and the other is positive), the quadrature bias points are equidistant from the initial un-phase shifted measurement $I_{FF2-0}$, and either phase shifter 220 may be selected to phase shift the optical carrier (because both use an equivalent amount of power to reach the quadrature point). Method 700 then proceeds to block 730, where either arm 240 is selected as the powered/driven arm 240. In various embodiments, at block 730, the initialization logic 410 selects one of the arms 240 based on that arm 240 being identified as a default or preferred arm 240, based on a random number generator or any other selection method for selecting one of the arms 240, etc. Method 700 may then conclude.

If the slope for the first arm 240a and the slope for the second arm 240b are the same polarity as one another (e.g., both are positive or both are negative), the shared polarity indicates that one of the first arm 240a and the second arm 240b is closer to the quadrature bias point than the other. Accordingly, a lower amount of power can be applied to one of the corresponding phase shifters 220 to phase shift the carrier signal to reach the phase shift needed to achieve bias the relative offset of the two versions of the carrier signal to the quadrature point than is needed to be applied to the other phase shifter 220.

At block 740, when the first slope$_1$ and the second slope$_2$ are both positive, method 700 proceeds to block 750. At block 740, when the first slope$_1$ and the second slope$_2$ are both negative, method 700 proceeds to block 760.

At block 750, the initialization logic 410 selects the phase shifter 220 in one of the first arm 240a and the second arm 240b to be the active or powered phase shifter 220 to which the driving current $I_D$ is to be applied. When the arm slopes are both positive, the interferometer 150 selects the second arm 240b as the second arm 240b is closer to the quadrature point, and will take less power to achieve the quadrature bias. For example, when both slope$_1$ and slope$_2$ are positive, the driving current $I_D$ supplied to the second phase shifter 220b to reach the maximum extinction ratio is less than the driving current $I_D$ supplied to the first phase shifter 220a to reach the maximum extinction ratio, and the initialization logic 410 therefore selects the second arm 240b. Method 700 may then conclude.

At block 760, the initialization logic 410 selects the phase shifter 220 in one of the first arm 240a and the second arm 240b to be the active or powered phase shifter 220 to which the driving current $I_D$ is to be applied. When the arm slopes are both negative, the interferometer 150 selects the first arm 240a as the first arm 240a is closer to the quadrature point, and will take less power to achieve the quadrature bias. For example, when slopes and slope$_2$ are negative, the driving current $I_D$ supplied to the first phase shifter 220a to reach the maximum extinction ratio is less than the driving current $I_D$ supplied to the second phase shifter 220b to reach the maximum extinction ratio, and the initialization logic 410 therefore selects the first arm 240a. Method 700 may then conclude.

In embodiments in which method 700 is repeated, the initialization logic 410 may select different phase shifters 220 at different times. For example, if the initialization logic 410 selects the first phase shifter 220a to be the powered phase shifter 220 when the optical signaling device 100 is first activated, but is powered down at a later time, when the optical signaling device 100 is next activated, the initialization logic 410 may select either the first phase shifter 220a or the second phase shifter 220b to be the powered phase shifter 220. Accordingly, as the efficiency of one phase shifter 220 changes relative to the other phase shifter 220 over time (e.g., due to thermal degradation, wear, etc.), the optical signaling device 100 can be recalibrated in the field to select the most power efficient phase shifter 220 to use as the powered phase shifter 220.

Figure 8:
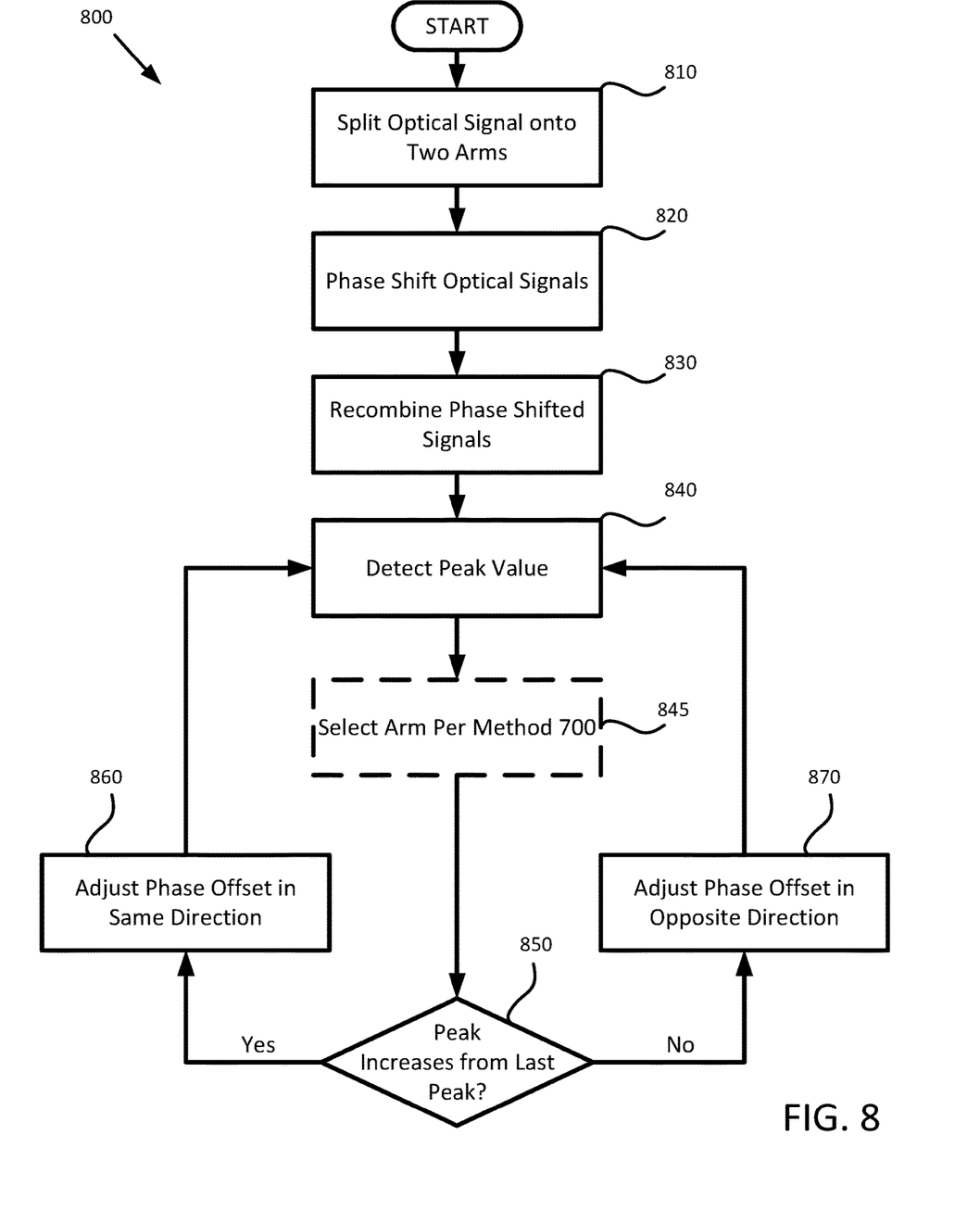
FIG. 8 is a flowchart of a method for adjusting a relative phase offset imparted in an interferometer, according to embodiments of the present disclosure.

FIG. 8 is a flowchart of a method 800 for adjusting a relative phase offset imparted in an interferometer 150, based on the peak value of signals output from the interferometer 150, to increase an amplitude of the peak value and thereby improve the biasing of the interferometer 150, according to embodiments of the present disclosure.

Method 800 begins with block 810, where a splitter 210 in the interferometer 150 receives an optical signal for use as a calibration signal and/or data transmission signal, and splits that optical signal onto a first signal arm 240a and a second signal arm 240b. At block 820, a phase shifter 220 on one of the signal arms 240 (e.g., as selected per method 700 described in greater detail in regard to FIG. 7) phase shifts the version of the optical signal carried on the corresponding signal arm 240. At block 830, a combiner 250 in the interferometer 150 receives the version of the optical signal carried on each of the signal arms 240 (which may be modulated to encode data thereon) and recombines the phase shifted signal with the un-phase shifted signal to produce an output signal. Blocks 810-840 are performed continuously so long as an optical signal is fed to the interferometer 150.

At block 840, a portion of the output signal (e.g., 5% captured by a tap) is converted to an electrical signal $I_{FF2}$, from which a TIA 160 detects the peak value in the electrical signal $I_{FF2}$.

In a first iteration of method 800, method 800 proceeds from block 840 to block 845. Otherwise, in subsequent iterations of method 800, method 800 proceeds from block 840 to block 850. For example, method 800 may detect an initial peak value in the output signal and set an initial phase offset during an initial iteration, and in a subsequent iteration detects a subsequent peak value in the output signal, and adjusts the relative phase offsets accordingly to maintain the peak value in a steady state to provide a maximized extinction ratio as time progresses.

At block 845, the controller 170 selects the arm 240 in which phase shift needs to be applied based on the output of method 700 and adjusts the phase offset in a first direction (e.g., by increasing or decreasing the power applied to the powered phase shifter 220), and the TIA 160 identifies a new peak value from the resulting electrical signal $I_{FF2}$.

At block 850, once the peak value measurements have begun, the controller 170 monitors the peak value to add to or remove from the phase shift to increase the extinction ratio until the maximum extinction ratio is reached, and then maintains the phase shift in a steady state for the maximized extinction ratio. In various embodiments, the controller 170 determines whether the peak value of the most recently measured output signal $I_{FF2}$ is higher or lower than the peak value of the previously measured output signal $I_{FF2}$ and accordingly how the driving current $I_D$ should be adjusted to increase the next peak value. For example, the controller 170 compares the peak value at time $t_0$ to the peak value at time $t_1$, the peak value at time $t_1$ to the peak value at time $t_2$, etc.

When the current peak value is greater than the previous peak value, method 800 proceeds from block 850 to block 860, where the controller 170 adjusts the phase offset in the same direction as in the previous iteration. For example, when the controller 170 adjusted the power upward from time $t_0$ to time $t_1$, at block 860 the controller 170 adjusts the power upward again for time $t_2$ (e.g., $P_0 < P_1 < P_2$). In another example, when the controller 170 adjusted the power downward from time $t_7$ to time $t_8$, at block 860 the controller 170 adjusts the power downward again for time $t_9$ (e.g., $P_7 > P_8 > P_9$). Method 800 returns from block 860 to block 840, where method 800 performs a next iteration with the newly adjusted driving current $I_D$.

When the current peak value is less than the previous peak value, method 800 proceeds from block 850 to block 870, where the controller 170 adjusts the phase offset in the opposite direction from the previous iteration. For example, when the controller 170 adjusted the power upward from time $t_0$ to time $t_1$, at block 870 the controller 170 adjusts the power downward for time $t_2$ (e.g., $P_0 < P_1$, $P_1 > P_2$). In another example, when the controller 170 adjusted the power downward from time $t_7$ to time $t_8$, at block 870 the controller 170 adjusts the power upward for time $t_9$ (e.g., $P_7 > P_8$, $P_8 < P_9$). Method 800 returns from block 870 to block 840, where method 800 performs a next iteration with the newly adjusted driving current $I_D$.

In consecutive iterations through block 840 of method 800, the controller 170 may adjust the power supplied to the phase shifter 220 upward-upward, downward-downward, upward-downward, or downward-upward. When the power supplied to the phase shifter 220 alternates between being increased and decreased in subsequent iterations (e.g., the upward-downward or downward-upward patterns), the phase shifter 220 is in a steady state that corresponds to a maximized value for the extinction ratio, which the controller 170 seeks to maintain within a range threshold for the output of the interferometer 150 to thereby stabilize the peak value to the maximized value.

Figure 9:
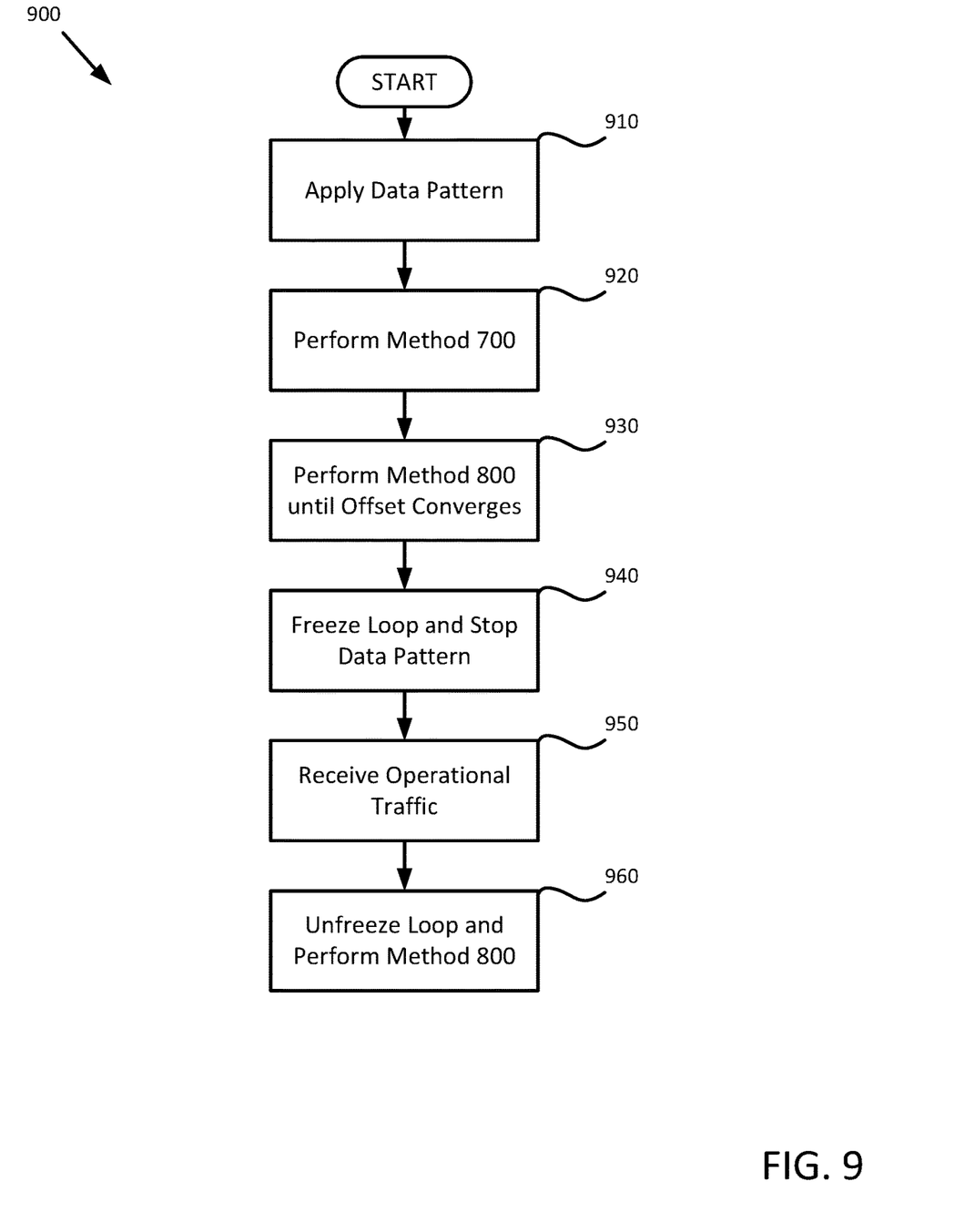
FIG. 9 is a flowchart of a method for setting and adjusting a driving current in an interferometer to maintain the extinction ratio in a steady state, according to embodiments of the present disclosure.

FIG. 9 is a flowchart of a method 900 for setting and adjusting a driving current in an interferometer 150 to maintain the extinction ratio in a steady state (within a range threshold), according to embodiments of the present disclosure.

At block 910, the optical signaling device 100 receives a known data pattern from the serializer 130, which is fed to the interferometer 150. In some embodiments, block 910 may be omitted and method 900 is performed with an operational signal to encode data of values that are not known a priori.

At block 920, the optical signaling device 100 performs method 700 (as described in relation to FIG. 7) as a calibration phase to identify and select one phase shifter 220 to use as a powered or active phase shifter 220 in the interferometer 150 (and for the other phase shifter 220 to be un-powered). The selected phase shifter 220 represents the phase shifter 220 that uses the least amount power of the two phase shifters 220 to impart a phase shift that biases the optical carrier signal to the quadrature point when recombined at the combiner 250 of the interferometer 150.

At block 930, the optical signaling device 100 performs method 800 until the driving current $I_D$ converges on the steady state value for the interferometer 150, at which point method 900 proceeds to block 940, where the steady state value for the driving current $I_D$ is frozen in the digital loop filter 420, and the known data pattern is stopped. Convergence to the steady state value can occur when the optical signaling device 100 identifies that the output is at a maximum value or within a convergence threshold, such as when the driving current $I_D$ swaps between increasing and decreasing in subsequent rounds or the change in the output is less than a preset amount.

At block 950, the interferometer 150 receives operational traffic (i.e., a live optical signal with initially unknown data to be modulated thereon), and proceeds to block 960.

At block 960, the optical signaling device 100 unfreezes the digital loop filter 420 to use the steady state value for the driving current $I_D$ as an initial value when performing method 800 for a second time. The second performance of method 800 may continue until the optical signaling device 100 is shut down, reset, or the input signal is interrupted, at which time method 900 may also conclude or restart.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF (Radio Frequency), etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   phase shifting, via a first phase shifter, a first optical signal carried on a first arm of an interferometer relative to a second optical signal carried on a second arm of the interferometer, wherein the first optical signal is a calibration signal generated on an optical device including the interferometer to initialize the first phase shifter;
   combining the first optical signal with the second optical signal as an output signal;
   detecting a peak value in the output signal;
   adjusting a relative phase offset imparted by the first phase shifter on the first optical signal relative to the second optical signal, based on the peak value, to increase an amplitude of the peak value;
   phase shifting, via the first phase shifter according to the relative phase offset, the first optical signal carried on the first arm relative to the second optical signal carried on the second arm;
   combining the first optical signal with the second optical signal as the output signal;
   detecting a second peak value in the output signal;
   adjusting the relative offset imparted by the first phase shifter on the first optical signal relative to the second optical signal, based on the second peak value until the second peak value converges within a range threshold to a steady state value; and
   setting the relative offset associated with the steady state value as an operational offset for the first phase shifter.

2. The method of claim 1, wherein the first optical signal is an operational signal generated to carry data to an external device, wherein the data are encoded onto the operational signal on at least one of the first arm and the second arm.

3. The method of claim 1, wherein detecting the peak value and adjusting the relative phase offset are performed continuously during operations of the interferometer.

4. The method of claim 1, further comprising:
   detecting a subsequent peak value in the output signal, wherein adjusting the relative phase offset comprises one of increasing the relative phase offset and decreasing the relative phase offset; and
   in response to the subsequent peak value being less than the peak value, adjusting the relative phase offset imparted by the first phase shifter on the first optical signal relative to the second optical signal according to the one of increasing the relative phase offset and decreasing the relative phase offset.

5. The method of claim 1, further comprising:
  detecting a subsequent peak value in the output signal, wherein adjusting the relative phase offset comprises one of increasing the relative phase offset and decreasing the relative phase offset; and
  in response to the subsequent peak value being less than the peak value, adjusting the relative phase offset imparted by the first phase shifter on the first optical signal relative to the second optical signal according to a different one of increasing the relative phase offset and decreasing the relative phase offset.

6. The method of claim 1, wherein the first phase shifter is selected as a powered phase shifter, and a second phase shifter included on the second arm is selected as an un-powered phase shifter based on a calibration phase performed at power on of the interferometer indicating that the first phase shifter requires less power to bias the first optical signal to a quadrature point than the second phase shifter.

7. A device, comprising:
  an interferometer, including:
    an optical input;
    a splitter, connected to the optical input, configured to split an optical signal carried by the optical input onto a first arm and a second arm, wherein the first arm comprises a first phase shifter and the second arm comprises a second phase shifter; and
    a combiner, connected to the first arm and the second arm, configured to re-combine the optical signal carried on the first arm and a second arm onto an optical output;
  a trans-impedance amplifier (TIA) configured to detect a peak value in the optical output of the interferometer; and
  a controller, including a loop filter, configured to adjust a phase offset between the first phase shifter and the second phase shifter based on an amplitude of the peak value; and
  wherein the first phase shifter is selected as a powered phase shifter and the second phase shifter is selected as an un-powered phase shifter based on a calibration phase performed at power on of the device indicating that the first phase shifter requires less power to bias the optical signal to a quadrature point than the second phase shifter.

8. The device of claim 7, wherein the optical signal used during the calibration phase is an operational signal of an initially unknown value carrying live traffic data.

9. The device of claim 7, wherein the optical signal used during the calibration phase is a known data pattern signal.

10. The device of claim 9, wherein the calibration phase is performed until a phase offset converges on a steady state value, wherein the first phase shifter is frozen to the phase offset until an operational signal of an initially unknown value is transmitted through the device.

11. The device of claim 7, wherein the loop filter adjusts the phase offset between the first phase shifter and the second phase shifter based on the amplitude of the peak value to stabilize the peak value at a maximized value.

12. The device of claim 11, wherein the maximized value changes over time based on thermal degradation of the interferometer.

13. A method, comprising:
  feeding a known data pattern to an interferometer;
  selecting one of a first phase shifter disposed on a first arm of the interferometer and a second phase shifter disposed on a second arm of the interferometer as a powered phase shifter;
  applying a series of phase offsets to the powered phase shifter until a peak value at an output of the interferometer converges to a steady state value according to a convergence threshold, wherein a phase offset associated with the steady state value is selected as an operational value;
  receiving an operational data stream as a first signal on the first arm and a second signal on the second arm;
  phase shifting one of the first signal and the second signal by the powered phase shifter according to the operational value;
  measuring the peak value at the output of the interferometer;
  applying, by the powered phase shifter, a first phase shift greater than the operational value; and
  in response to the peak value increasing in response applying the first phase shift, applying a second phase shift greater than the first phase shift.

14. The method of claim 13, wherein the peak value is detected via a trans-impedance amplifier.

15. The method of claim 13, wherein selecting the one of the first phase shifter and the second phase shifter as the powered phase shifter further comprises:
  measuring an initial peak value without powering the first phase shifter and the second phase shifter;
  measuring a first peak value when powering the first phase shifter with a fixed amount of power and not powering the second phase shifter;
  measuring a second peak value when powering the second phase shifter with the fixed amount of power and not powering the first phase shifter;
  determining a first slope based on the initial peak value and the first peak value;
  determining a second slope based on the initial peak value and the second peak value; and
  selecting, based on the first slope and the second slope, the one of the first phase shifter and the second phase shifter that requires less power to bias an optical signal to a quadrature point.

16. The method of claim 15, in response to identifying, based on the first slope and the second slope, that the first phase shifter and the second phase shifter require equivalent power to bias the optical signal to the quadrature point, selecting the first phase shifter as the powered phase shifter.

17. The method of claim 13, further comprising:
  measuring the peak value at the output of the interferometer at a time after applying the second phase shift; and
  in response to the peak value decreasing in response applying the second phase shift, applying a third phase shift less than the second phase shift.

18. The method of claim 13, further comprising:
  measuring the peak value at the output of the interferometer at a time after applying the second phase shift; and
  in response to the peak value increasing in response applying the second phase shift, applying a third phase shift greater than the second phase shift.

* * * * *

UNITED STATES PATENT AND TRADEMARK OFFICE
CERTIFICATE OF CORRECTION

| | |
|---|---|
| PATENT NO. | : 10,965,377 B1 |
| APPLICATION NO. | : 16/745257 |
| DATED | : March 30, 2021 |
| INVENTOR(S) | : Craig S. Appel et al. |

Page 1 of 1

It is certified that error appears in the above-identified patent and that said Letters Patent is hereby corrected as shown below:

In the Specification

In Column 5, Line 36, delete "+$\pi/8$" and insert -- +$3\pi/8$ --, therefor.

In Column 10, Line 12, delete "slopes" and insert -- $slope_1$ --, therefor.

Signed and Sealed this
Eighth Day of June, 2021

Drew Hirshfeld
*Performing the Functions and Duties of the
Under Secretary of Commerce for Intellectual Property and
Director of the United States Patent and Trademark Office*